(12) United States Patent
Haldeman et al.

(10) Patent No.: US 10,487,177 B2
(45) Date of Patent: Nov. 26, 2019

(54) COPOLYMERS EXHIBITING IMPROVED THERMO-OXIDATIVE STABILITY

(71) Applicant: Tetramer Technologies, LLC, Pendleton, SC (US)

(72) Inventors: Adam T. Haldeman, Seneca, SC (US); Tyler L. Duniho, Anderson, SC (US); Brad P. Morgan, Anderson, SC (US); Margaret Shaughnessy, Central, SC (US); Kyle A. Berger, Waco, TX (US); Jeffrey R. DiMaio, Pendleton, SC (US)

(73) Assignee: Tetramer Technologies, Inc., Pendleton, SC (US)

( * ) Notice: Subject to any disclaimer, the term of this patent is extended or adjusted under 35 U.S.C. 154(b) by 21 days.

(21) Appl. No.: 15/667,855

(22) Filed: Aug. 3, 2017

(65) Prior Publication Data
US 2018/0037700 A1    Feb. 8, 2018

Related U.S. Application Data

(60) Provisional application No. 62/370,782, filed on Aug. 4, 2016.

(51) Int. Cl.
*C08G 73/10* (2006.01)
*C09D 179/08* (2006.01)

(52) U.S. Cl.
CPC ..... *C08G 73/1067* (2013.01); *C08G 73/1014* (2013.01); *C08G 73/1039* (2013.01); *C08G 73/1042* (2013.01); *C08G 73/1053* (2013.01); *C08G 73/1071* (2013.01); *C09D 179/08* (2013.01)

(58) Field of Classification Search
CPC ............ C08G 73/1067; C08G 73/1014; C08G 73/1039; C08G 73/1042; C08G 73/1053; C08G 73/1073; C08G 73/1071; C09D 179/08
See application file for complete search history.

(56) References Cited

U.S. PATENT DOCUMENTS

2014/0218875 A1*    8/2014    Nakayama ......... C08G 73/1021
                                                     361/751

\* cited by examiner

*Primary Examiner* — Patrick D Niland
(74) *Attorney, Agent, or Firm* — Burr & Forman LLP; Douglas L. Lineberry (57) ABSTRACT

Polyamic acid polymers with varying ratios of rigid monomers and solubilizing monomers exhibiting improved thermo-oxidative stability.

20 Claims, 5 Drawing Sheets

| Example | Aromatic tetracarboxylic dianhydride | | | | | Aromatic diamine | | | | | Solution viscosity | Rapid cure film quality |
|---|---|---|---|---|---|---|---|---|---|---|---|---|
| | BPDA g | mmol | ODPA g | mmol | Ratio | PDA g | mmol | TPH g | mmol | Ratio | (TCA) cP (2.00) (cP) | |
| 1 | 10.298 | 35.00 | 4.653 | 15.00 | 70/30 | 3.785 | 35.00 | 4.803 | 15.00 | 70/30 | 1500 / 6,075 | Strong film, no cracks upon curing, good adhesion |
| 2 | 14.711 | 50.00 | - | - | 100/0 | 5.407 | 50.00 | - | - | 100/0 | 2500 / >100,000 | Cracks immediately upon curing, very poor adhesion |
| 3 | 14.711 | 50.00 | - | - | 100/0 | 2.704 | 25.00 | 8.006 | 25.00 | 50/50 | 1400 / 51,000 | Fair film strength, few cracks upon cure, fair adhesion |
| 4 | 7.355 | 25.00 | 7.755 | 25.00 | 50/50 | 5.407 | 50.00 | - | - | 100/0 | 1100 / 11,000 | Weak film, cracks upon curing, poor adhesion |
| 5 | 7.355 | 25.00 | 7.755 | 25.00 | 50/50 | 4.866 | 45.00 | 1.601 | 5.00 | 90/10 | 800 / 6,250 | Fair film strength, few cracks upon cure, fair adhesion |
| 6 | 7.355 | 25.00 | 7.755 | 25.00 | 50/50 | 3.785 | 35.00 | 4.803 | 15.00 | 70/30 | 800 / 2,175 | Strong film, no cracks upon curing, good adhesion |

FIGURE 1

| Example | Aromatic tetracarboxylic dianhydride | | | | | Aromatic diamine | | | | | Terminal crosslinking agent | | $T_{d,\text{onset}}$ (TGA) °C | $t_{5\% \text{ loss}}$ (TGA) min | Solution viscosity (30 °C) cP |
|---|---|---|---|---|---|---|---|---|---|---|---|---|---|---|---|
| | BPDA | | ODPA | | | PDA | | TFM | | | PEPA | | | | |
| | g | mmol | g | mmol | Ratio | g | mmol | g | mmol | Ratio | g | mmol | | | |
| 8 | - | - | 15.511 | 50.00 | 0/100 | - | - | 16.012 | 50.00 | 0/100 | - | - | 531.4 | 247.0 | 2,695 |
| 9 | - | - | 15.045 | 48.50 | 0/100 | - | - | 16.492 | 51.50 | 0/100 | 0.745 | 3.00 | 530.0 | 264.2 | 810 |
| 10 | - | - | 14.735 | 47.50 | 0/100 | - | - | 16.812 | 52.50 | 0/100 | 1.241 | 5.00 | 535.1 | 301.9 | 449 |
| 11 | - | - | 14.425 | 46.50 | 0/100 | - | - | 17.132 | 53.50 | 0/100 | 1.738 | 7.00 | 535.3 | 303.5 | 329 |
| 12 | 7.356 | 25.00 | 7.755 | 25.00 | 50/50 | - | - | 16.012 | 50.00 | 0/100 | - | - | 539.3 | 324.6 | 5,562 |
| 13 | 7.356 | 25.00 | 7.755 | 25.00 | 50/50 | 0.541 | 5.00 | 14.410 | 45.00 | 10/90 | - | - | 549.0 | 538.0 | 72,785 |
| 14 | 7.356 | 25.00 | 7.755 | 25.00 | 50/50 | 0.557 | 5.15 | 14.843 | 46.35 | 10/90 | 0.745 | 3.00 | 544.0 | 503.0 | 8,894 |
| 15 | 5.884 | 20.00 | 9.306 | 30.00 | 40/60 | 0.541 | 5.00 | 14.410 | 45.00 | 10/90 | - | - | 554.0 | 485.0 | 10,920 |
| 7 | 5.884 | 20.00 | 9.306 | 30.00 | 40/60 | 0.557 | 5.15 | 14.843 | 46.35 | 10/90 | 0.745 | 3.00 | 551.0 | 448.0 | 2,452 |

FIGURE 2

| Example | Fiber draw parameters ||| Fiber coating characteristics ||||
| --- | --- | --- | --- | --- | --- | --- | --- |
| | Cure temperature °C | Draw rate m/min | Dye size μm | Coating quality | Thickness μm | Observations | Solubility of coating (NMP, 25 °C) |
| 16 | 450 | 20 | 250 | + | 5 | Smooth, strong coating | Insoluble |
| 17 | 450 | 20 | 250 | + | 7 | Smooth, strong coating | Insoluble |
| 18 | 215 | 20 | 250 | + | 8 | Smooth, strong coating | Very soluble |
| 19 | 350 to 500 | 20 | 250 | -- | 2 | Cracked coating that falls of the fiber | Insoluble |
| 20 | 400 | 20 | 375 | + | 20 | Smooth, strong coating | Very soluble |
| 21 | 450 | 20 | 250 | + | 5 | Smooth, strong coating | Insoluble |

FIGURE 3

| Example | $T_{d,\,onset}$ (TGA) °C | $t_{20\%\,loss}$ (TGA) min | Lifetime Projection (TGA) at 300 °C days | at 350 °C days | at 400 °C days |
|---|---|---|---|---|---|
| 16 | 520 | 13.5 | 1092 | 52 | 3.9 |
| 17 | 530 | 10.7 | 1055 | 44 | 3.0 |
| 18 | 503 | 8.7 | 1038 | 45 | 3.1 |
| 19 | Could not be evaluated due to poor coating quality | | | | |
| 20 | 450 | 1.9 | 681 | 16 | 0.63 |
| 21 | 498 | 5.2 | 570 | 26 | 1.9 |
| Comparative Example 1 | 484 | 3.1 | 89 | 7 | 0.8 |
| Comparative Example 2 | 501 | 7 | 627 | 36 | 3.1 |
| Comparative Example 3 | 498 | 4.4 | 96 | 7.6 | 0.9 |
| Comparative Example 4 | 504 | 5.6 | 78 | 6.8 | 0.8 |
| Comparative Example 5 | 504 | 6.6 | 87 | 7.1 | 0.9 |

FIGURE 4

| Fluid # | Description | Fluid # | Description |
|---|---|---|---|
| 1 | Turbine engine fuel | 13 | TKS Blend (deicer, aircraft) |
| 2 | Ultra Low Sulfur Diesel | 14 | Crytech XT360 (deicer, runway) |
| 3 | 87 Octane Gasoline | 15 | Sea Water |
| 4 | Hydraulic fluid, petroleum based red | 16 | Reagent Water |
| 5 | Hydraulic fluid, synthetic diester based | 17 | Isopropyl Alcohol |
| 6 | Hydraulic fluid, synthetic PAO based red | 18 | Methyl Isobutyl Ketone |
| 7 | Radcolube 2075 Hydraulic fluid | 19 | Calla 855 (cleaners/solvents, alkaline detergent) |
| 8 | Hydraulic fluid, phosphate ester based | 20 | NOX Rust 110 DLS (corrosion preventive compound) |
| 9 | 2091 TEP (lubricating oil) | 21 | Zip Chem D5026 (corrosion preventive compound) |
| 10 | Aeroshell Turbine Oil 500 (lubricating oil) | 22 | Methanol |
| 11 | Control, No Fluid | 23 | Toluene |
| 12 | Xceltherm 500M (coolant fluid, PAO based dielectric fluid) | | |

FIGURE 5

COPOLYMERS EXHIBITING IMPROVED THERMO-OXIDATIVE STABILITY

ACKNOWLEDGEMENT OF SUPPORT

This material is based upon work supported by the National Science Foundation under Grant No. IIP-1330948.

BACKGROUND OF THE INVENTION

1) Field of the Invention

The current disclosure relates to polyamic acid and polyimide polymers with varying ratios of rigid monomers and solubilizing monomers exhibiting improved thermo-oxidative stability and processing characteristics.

2) Description of Related Art

The development of aromatic polyimides has a rich, international history that began in the 1950s with DuPont's "convertible polymers" research program, which aimed to produce processable polymeric precursors that could be converted to a final intractable polymer (U.S. Pat. No. 2,710,853). This research effort rapidly matured into the first commercial aromatic polyimide material prepared from pyromellitic dianhydride (PMDA) and oxydianiline (ODA), now trademarked as Kapton®, Vespel®, and Pyre-ML® for different applications. The PMDA-ODA polyimide possessed a combination of thermal durability, mechanical toughness, chemical resistance, and attractive electrical properties that was unlike any other polymer known at the time. Since that time, numerous other polyimide materials have been commercialized in applications ranging from electronics manufacturing to fiber reinforced structural composites to separations membranes.

Aromatic polyimide materials offer clear performance advantages over other polymers, especially in high temperature applications where thermal durability is critical; however, processing of these materials is characteristically difficult. Furthermore, the more thermally stable a polyimide composition is, generally the more difficult it is to process. For example, the polyimide prepared from the most readily-available and reactive of common monomers, pyromellitic dianhydride (PMDA) and 1,4-diaminobenzene (PDA), has not been highly commercialized because the polymer is too brittle to be useful in most applications. Further, the polyimide prepared from 2,3,3',4'-biphenyltetracarboxylic dianhydride (BPDA) and PDA, originally developed by Ube Industries and produced under the trademark Upilex®, has been reported to be one of the most thermally stable and chemically resistant materials of common commercial polyimide structures.

The exceptional thermal stability of the BPDA-PDA polyimide results from the very linear, rigid, and fully aromatic nature of the polymer. Unfortunately, the same intrinsic properties that lend high thermal stability and chemical resistance to the material also cause it to be less mechanically tough, anisotropic and partially crystalline, and difficult to apply to substrates without the use of adhesion promoters. Even the polyamic acid precursor to the BPDA-PDA polyimide is of low solubility and difficult to dissolve in conventional solvents at concentrations much above 10 wt % with useful viscosity.

The demand for polyimide materials with greater processability has led to a wide body of research and development in both academia and industry. Commercial polyimide structures were developed with alternative monomers such as 4,4'-oxydiphthalic anhydride (ODPA), 3,3',4,4'-benzophenone tetracarboxylic dianhydride (BTDA), and 4,4'-oxydianiline (ODA) to make polyimide materials with increased mechanical toughness and improved processability compared to BPDA-PDA. The ether-containing monomers, ODPA and ODA, have the added benefit of increasing the hydrolytic stability of the polyimide. Monomers with substituted aromatic structures have been employed to disrupt polymer chain packing and improve solubility as well as affect other properties of interest such as optical transparency and physical permeability. U.S. Pat. Nos. 5,071,997 and 5,310,863 describe the use of trifluoromethyl-substituted diamines to increase isotropy and improve mechanical strength in BPDA-PDA and other polyimides.

The melt-processable polyimide resins developed by the National Aeronautics and Space Association (NASA) were a breakthrough in polyimide technology, opening the way for resin-transfer molded polyimide parts. The development of melt processable polyetherimides, such as Ultem® developed by General Electric Plastics, facilitated the manufacture of extruded, thermoformed, blow molded, and injection molded polyimide products, as well as fiber reinforced structure resins and pre-impregnated composite materials.

While all of these advances have enabled a large field of use for polyimide materials, applications such as harsh environment fiber optics continue to drive demand for materials with higher thermal stability and more facile processing. Prior to this disclosure, no polyimide material has been developed that possesses thermal stability equivalent to that of BPDA-PDA without its processing limitations; thus a design approach to polyimides with greater ease of use as well as exceptional thermal durability and chemical resistance is the aim of the present disclosure.

In order to fully address the need for polyimide materials with greater processability, the thermal imidization process, which is common and critical to most applications, must be considered. Conventional polyimide materials such as BPDA-PDA and PMDA-ODA are regarded as thermoset polymers and are also insoluble in all organic solvents; these inherent properties dictate that they must be cast from solutions of their more processable precursors, polyamic acids. As a result of this, manufacturing processes for polyimide films or coated substrates must provide sufficient thermal energy to evaporate the casting solvent, convert the polyamic acid to the polyimide, and remove the water that evolved as a product of thermal imidization. To fully convert the polymer, processing temperatures must exceed the glass transition temperature of the polyimide, more than 450° C. Any residual polyamic acid left in the final product is deleterious to its performance in most applications due to the poor thermal and chemical stability of the polyamic acid bond, which depolymerizes slowly at room temperature and rapidly at elevated temperature or in the presence of water.

U.S. Pat. No. 5,714,196 discloses an approach to a low temperature curing polyimide coating, where a polyamic acid polymer solution is cured at temperatures no greater than 300° C. on a low glass transition temperature optical fiber. While this approach does not utilize the polymer design of the present disclosure nor does it guarantee a fully imidized coating like a pre-imidized coating solution as disclosed herein, it demonstrates the advantage of a low cure temperature to form a unique fiber configuration. Additionally, the authors show another advantage of a soluble polyimide coating—the polyimide coating could be stripped from the fiber with acetone.

Accordingly, it is an object of the current disclosure to provide a novel approach to polymer design in order to provide polyimide materials that can be processed from pre-imidized solutions yet possess thermal stability and chemical resistance sufficient for use in harsh environments.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the current disclosure will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

SUMMARY OF THE INVENTION

In one embodiment, the current disclosure provides a polyimide composition. The composition includes a dianhydride component. The dianhydride component further comprises at least one rigid aromatic dianhydride monomer comprising 20 to 97 molar percent of the dianhydride component and at least one solubilizing aromatic dianhydride monomer comprising 3 to 80 molar percent of the dianhydride component. The polyimide composition further includes a diamine component. The diamine component includes at least one rigid aromatic diamine monomer comprising 10 to 75 molar percent of the diamine component and at least one solubilizing aromatic diamine monomer comprising 25 to 90 molar percent of the diamine component. The polyimide composition also includes at least one terminal mono-functional end group comprising 0 to 7 molar percent of the total polymer composition.

In a further embodiment, the current disclosure provides that the polyimide composition exhibits exceptional thermal stability evidenced by a time to 20% mass loss at 450° C. in air greater than 7 hours. Still further, the current disclosure discloses the polyamic acid precursor to the polyimide composition. In another embodiment, the polyimide composition is soluble in organic solvents. In a further embodiment, the polyimide composition comprises a pre-imidized solution. Still further, the polyimide composition comprises a solvent-strippable coating on an article. Even further, the solvent-strippable coating is formed via polyimide deposition at temperatures from 25° C. to 400° C. Still further yet, the polyimide composition may be used to facilitate polyimide coating deposition at a processing rate selected from the group consisting of: exceeding 1 meter per minute for free-standing films, exceeding 10 meters per minute for metal wire, or exceeding 20 meters per minute for optical fiber. Even further still, the polyimide composition comprises terminal crosslinkable end groups. Further yet, the polyimide composition comprises a polymer coating thermally cross-linked at temperatures exceeding 300° C. to render the coating insoluble in conventional polyimide solvents. Further still, the polyimide composition is optionally dissolved with at least one organic solvent. In another embodiment, the polyimide composition has a structure selected from the group consisting of films, powders, composites, sprays, emulsions, foams, or melt processed articles. Further yet, the polyimide composition is optionally directly applied to an article. Still yet further, the polyimide composition is optionally laminated as a free-standing film to an article either with or without an adhesive between the free-standing film and the article. Furthermore, the polyimide composition includes BPDA, p-PDA, or m-PDA are used as the rigid monomer components, ODPA or TFM are used as the solubilizing components, and phthalic anhydride or PEPA are terminal mono-functional end groups. Further, a method for forming the polyamic acid polymer of the polyimide composition includes charging a reaction vessel with diamines and NMP, introducing a solution of terminal mono-functional end group and NMP, adding dianhydride monomers comprising dianhydrides and NMP; and polymerizing the mixture. Further yet, the polyamic acid is imidized via cyclodehydration through chemical or thermal treatment of the polyamic acid precursor as a solution or solid.

In another alternative, a polyimide composition is provided. The polyimide composition includes a dianhydride component. The dianhydride component includes at least one rigid aromatic dianhydride monomer comprising 40 to 70 molar percent of the dianhydride component and at least one solubilizing aromatic dianhydride monomer comprising 30 to 60 molar percent of the dianhydride component. The polyimide composition also includes a diamine component. The diamine component includes at least one rigid aromatic diamine monomer comprising 10 to 70 molar percent of the diamine component and at least one solubilizing aromatic diamine monomer comprising 30 to 90 molar percent of the diamine component. The polyimide composition also includes at least one terminal mono-functional end group comprising 3 to 5 molar percent of the total polymer composition.

In a further optional embodiment, a method is provided for depositing a soluble polyimide with crosslinkable endgroups and high thermal stability to provide a coating that is initially solvent strippable but can be rendered insoluble with increased chemical resistance by crosslinking the coating in post deposition processes.

Still further, the current disclosure provides a method of depositing a soluble polyimide with high thermal stability to provide a coating with low residual mechanical stresses.

Further yet, the current disclosure provides a method of depositing a soluble polyimide with crosslinkable endgroups and high thermal stability to provide a coating that can be chemically fused to other similarly coated articles.

The current disclosure also provides a method of fusing two articles coated with a crosslinkable polyimide by placing the two articles in contact with one another and heating the articles to beyond the softening temperature and onset of thermal crosslinking of the coatings.

Further still, a method is provided for recoating stripped sections of enameled fibers or wires with a solution of a pre-imidized soluble polyimide with crosslinkable endgroups and high thermal stability.

Optionally, the polyimide composition is a sizing agent, coating, or matrix material in a composite article.

Further yet, the polyimide composition optionally forms electrical insulation, thermal insulation, and mechanical modification of substrates.

Still further the current disclosure provides polyamic acid polymers with varying ratios of rigid monomers and solubilizing monomers exhibiting improved thermo-oxidative stability.

A method for forming polymer coatings with improved thermal stability and chemical resistance. The method includes forming a polyimide composition. The composition includes a dianhydride component further comprising: at least one rigid aromatic dianhydride monomer comprising 20 to 97 molar percent of the dianhydride component and at least one solubilizing aromatic dianhydride monomer comprising 3 to 80 molar percent of the dianhydride component. The polyimide composition also includes a diamine component. The diamine component includes: at least one rigid aromatic diamine monomer comprising 10 to 75 molar percent of the diamine component; and at least one solubilizing aromatic diamine monomer comprising 25 to 90 molar percent of the diamine component; and at least one terminal mono-functional end group comprising 0 to 7 molar percent of the total polymer composition. The polyimide composition is applied to an article. The polyimide composition optionally is applied in a form selected from the group comprising a film, powder, composite, spray, emulsion, foam, melt, or combinations of the above.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The present disclosure provides polyamic acid copolymers and polyimide copolymers that exhibit: (1) exceptional thermo-oxidative stability, chemical resistance, and hydrolytic stability; (2) excellent solubility in solvents such that solutions can be prepared with moderate to high solids content; and (3) facile application, via a variety of forms, to a wide variety of substrates including but not limited to films, wires, fibers, plates, polymer sheets, metals, plastics, synthetics, nonwovens, composites, etc.

The present disclosure may also provide polyamic acid copolymers that exhibit those same characteristics and additionally retain solubility in solvents when thermally or chemically converted to the corresponding polyimide copolymers, polymer films prepared from the polyamic acid copolymer and/or polyimide copolymer. These polyimide copolymers may also be cross-linked to provide high chemical resistance.

Through these soluble polyimide copolymers, the present disclosure provides the unique ability to: (1) apply pre-imidized polyimide coatings out of solvents with low processing temperatures or lower toxicity compared to typical polyimide coating solvents; (2) deposit fully-imidized coatings at processing temperatures below the onset temperature for thermal imidization; (3) deposit fully-imidized coatings at high processing rates; (4) tune the solubility of the polyimide coating by varying cure temperature to arrive at a polyimide that is readily dissolved or completely insoluble; and (5) provide polyimide coating solutions with extended shelf life without the need for refrigerated storage.

In further embodiments, the present disclosure provides a solution of the polyamic acid copolymer and/or polyimide copolymer, coated articles obtained from the application of the polyamic acid copolymer and/or polyimide copolymer, polymer fibers prepared from the polyamic acid copolymer and/or polyimide copolymer, and fiber-reinforced composite materials obtained from polyamic acid copolymer and/or polyimide copolymer.

1. Polymer Design Concept

In the current disclosure, polyamic acid and polyimide copolymers with the desired properties are obtained through the design of compositions comprised of (X) at least two aromatic tetracarboxylic acid dianhydrides, of which at least one possesses a rigid linear molecular structure and at least one possesses a solubilizing molecular structure, (Y) at least two aromatic diamine monomers, of which at least one possesses a rigid linear molecular structure and at least one possesses a solubilizing molecular structure, and (Z) may include terminal mono-functional monomers with or without crosslinkable groups.

Said rigid linear monomers are selected to have solely unsubstituted aromatic hydrocarbons other than their mono- meric functionality, no aliphatic carbon or oxygen bridging unless bound in a ring structure, and monomeric functionality in or near to the same plane. Rigid linear components are employed in the copolymer design to impart high thermal stability, high mechanical strength, improved chemical resistance, and increase glass transition temperature in the corresponding polyimide.

Said solubilizing monomers are selected to be aromatic species with non-coplanar, non-linear, aliphatic or ether bridging between aromatic rings, aliphatic substitution of aromatic rings, and nitrogen or oxygen containing aromatic heterocycles. Solubilizing monomers are employed in the copolymer design to increase solubility of the polyamic acid and polyimide in solvents, increase mechanical toughness, and improve the processing and application characteristics of the polymer and solutions of the polymer.

Said terminal mono-functional monomers are selected to have single amine or anhydride functionalization such that their addition to the polymer structure limits molecular weight of the resulting polyamic acid or polyimide copolymer. These mono-functional monomers may also include functionality such as a double or triple bond that allows for thermal, chemical, or photo-initiated crosslinking with other species in adjacent polymer chains or additives within the coating solutions prepared with the polymer. Mono-functional monomers are employed in the copolymer design to provide control of solution viscosity by limiting molecular weight growth, improve thermal stability by eliminating labile terminal groups, and, in the case of crosslinkable terminal groups, these monomers provide a means to impart improved chemical resistance and higher mechanical modulus of the polymer after crosslinking treatments.

1.1 Polymer Compositions

The design of the polyamic acid or polyimide copolymers of the current disclosure are optionally described by formula (1).

$$Z-Y-[X-Y]_n-Z \quad \text{or} \quad Z-X-[Y-X]_n-Z \qquad (1)$$

Where X represents the polyamic acid or polyimide product of aromatic dianhydrides and consists of 20 to 97 molar percent selected from rigid linear aromatic dianhydrides and 3 to 80 molar selected from solubilizing aromatic dianhydrides, Y represents the polyamic acid or polyimide product of aromatic diamines and consists of 10 to 75 molar percent selected from rigid linear aromatic diamines and 25 to 90 molar percent selected from rigid linear aromatic diamines, Z represents mono-functional terminal groups used in an amount of 0 to 5 molar percent with respect to the sum of the moles of X and Y, and n represents the degree of polymerization, which depending on the content of Z, will be no less than 20. The number average molecular weight (Mn) will be 10,000 to 50,000 g/mol.

In an alternative embodiment, the dianhydride component optionally includes at least one rigid aromatic dianhydride monomer comprising 40 to 70 molar percent of the dianhydride component and at least one solubilizing aromatic dianhydride monomer comprising 30 to 60 molar percent of the dianhydride component. Further, the diamine component optionally includes at least one rigid aromatic diamine monomer comprising 10 to 70 molar percent of the diamine component and at least one solubilizing aromatic diamine monomer comprising 30 to 90 molar percent of the diamine component. The polyimide composition also includes at least one terminal mono-functional end group comprising 3 to 5 molar percent of the total polymer composition.

1.2 Aromatic Tetracarboxylic Dianhydrides

Suitable non-limiting examples of aromatic dianhydrides that may be used as a rigid linear component in the copolymer design may be 3,3',4,4'-biphenyltetracarboxylic dianhydride, 1,2,4,5-benzenetetracarboxylic dianhydride, naphthalene-1,4,5,8-tetracarboxylic dianhydride, naphthalene-2,3,6,7-tetracarboxylic dianhydride, perylene-3,4,9,10-tetracarboxylic dianhydride, and 4,4'-binaphthyl-1,1'8,8'-tetracarboxylic dianhydride.

Suitable non-limiting examples of aromatic dianhydrides that may be used as a solubilizing component in the copolymer design may be 4,4'-oxydiphthalic anhydride, 3,4'-oxydiphthalic anhydride, 3,3',4,4'-diphenylsulfonetetracarboxylic dianhydride, 4,4'-(ethyne-1,2-diyl)diphthalic anhydride, hydroquinone dianhydride, benzophenone-3,3',4,4'-tetracarboxylic dianhydride, 2,2',3,3'-biphenyltetracarboxylic dianhydride, 2,3,3',4'-biphenyltetracarboxylic dianhydride, 4,4'-(hexafluoroisopropylidene)diphthalic anhydride, 4,4'-(4,4'-isopropylidenediphenoxy)bis(phthalic anhydride), 9,9-bistrifluoromethyl-2,3,6,7-xanthenetetracarboxylic dianhydride.

1.3 Aromatic Diamines

Suitable non-limiting examples of aromatic diamines that may be used as a rigid linear component in the copolymer design may be p-phenylenediamine, m-phenylenediamine, 1,4-diaminonaphthalene, 2,6-diaminonaphthalene, 2,6-diaminoanthraquinone, 4,4''-diamino-p-terphenyl, benzidine, 2,7-diaminopyrene.

Suitable non-limiting examples of aromatic diamines that may be used as a solubilizing component in the copolymer design may be 2,2'-bis(trifluoromethyl)benzidine, 4,4'-oxydianiline, 3,4'-oxydianiline, 3,3'-oxydianiline, 1,5-diaminonaphthalene, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 4,4'-bis(4-amino-2-trifluoromethylphenoxy)biphenyl, 4,4'-bis(4-aminophenoxy)biphenyl, 1,4-bis(4-amino-2-trifluoromethylphenoxy)benzene, 5-(trifluoromethyl)-1,3-phenylenediamine, 2-(trifluoromethyl)-1,4-phenylenediamine, 3,3'-diaminobenzophenone, 4,4'-diaminobenzophenone, 3,4'-diaminobenzophenone, 2,5-bis(4-aminophenoxy) biphenyl, 3,3'-dihydroxybenzidine, bis(3-aminophenyl) sulfone, Bis(3-amino-4-hydroxyphenyl) Sulfone, bis(3-amino-4-hydroxyphenyl) sulfone, o-phenylenediamine, 4,4'-(hexafluoroisopropylidene)dianiline, 2,2-bis(3-amino-4-hydroxyphenyl)hexafluoropropane, 5,5'-(hexafluoroisopropylidene)di-o-toluidine, 3,3',5,5'-tetramethyl-4,4'-diaminodiphenylmethane, 2,2-bis[4-(4-aminophenoxy)phenyl]propane, 2,2-bis[4-(4-aminophenoxy)phenyl]hexafluoropropane, 2,2-bis(3-aminophenyl)hexafluoropropane, 2,2-bis(4-aminophenyl) hexafluoropropane, 1,3-bis[2-(4-aminophenyl)-2-propyl] benzene, 2,7-diaminofluorene, 1,1-Bis(4-aminophenyl) cyclohexane, o-tolidine, m-tolidine, o-dianisidine, 3,3',5,5'-tetramethylbenzidine, 2,3,5,6-tetrafluoro-1,4-phenylenediamine, 2,3,5,6-tetramethyl-1,4-phenylenediamine, 2,4-diaminomesitylene, 2,4,5,6-tetrafluoro-1,3-phenylenediamine, 9,9-Bis(4-aminophenyl) fluorene, 9,9-Bis(3-amino-4-hydroxyphenyl)fluorene, 1,6-diaminopyrene, 1,3-diaminopyrene, 1,8-diaminopyrene, 2,3-diaminotoluene, 2,4-diaminotoluene, 2,5-diaminotoluene, 2,6-diaminotoluene, 2,3-diaminopyridine, 3,4-diaminopyridine, 2,5-diaminopyridine, 2,6-diaminopyridine, 6-methyl-1,3,5-triazine-2,4-diamine, 2,4-diamino-6-phenyl-1,3,5-triazine, 2,4-diamino-6-hydroxypyrimidine, 1,1'-binaphthyl-2,2'-diamine, 4,4'-diaminooctafluorobiphenyl, 3,7-diamino-2,8-dimethyldibenzothiophene sulfone.

1.4 Terminal Mono-Functional Groups

Non-limiting examples of terminal mono-functional monomers that may be used as non-crosslinkable end-groups may be phthalic anhydride, naphthalic anhydride, aniline, naphthylamine, and the isomers and substituted products of these.

Non-limiting examples of terminal mono-functional monomers that may be used as crosslinkable end-groups may be groups containing a triple bond such as 4-(phenylethynyl)phthalic anhydride, 4-ethynylphthalic anhydride, propargylamine, 3-ethynylaniline, 4-ethynylaniline, 3-phenylethynylaniline as well as groups containing a double bond such as maleic anhydride, 5-norbornene-2,3-dicarboxylic anhydride, citraconic anhydride, itaconic anhydride, 4-aminobenzocyclobutene, vinylaniline, and p-aminostyrene.

1.5 Preferred Compositions within the Polymer Design

In preferred embodiments of the invention none of the selected monomers optionally would contain: no aliphatic carbon or oxygen bridging unless bound in a ring structure, no aliphatic hydrocarbon substituents on the aromatic rings, and aromatic fluorine atoms.

Non-limiting examples of preferred aromatic dianhydrides that may be used as a rigid linear component in the polymer design may be 3,3',4,4'-biphenyltetracarboxylic dianhydride, 1,2,4,5-benzenetetracarboxylic dianhydride, naphthalene-1,4,5,8-tetracarboxylic dianhydride, and naphthalene-2,3,6,7-tetracarboxylic dianhydride.

Non-limiting examples of preferred aromatic diamines that may be used as a rigid linear component in the polymer design may be p-phenylenediamine, m-phenylenediamine, 1,4-diaminonaphthalene, 2,6-diaminonaphthalene, and 2,6-diaminoanthraquinone.

Non-limiting examples of preferred aromatic dianhydrides that may be used as a solubilizing component in the polymer design may be 4,4'-oxydiphthalic anhydride, 3,4'-oxydiphthalic anhydride, 3,3',4,4'-diphenylsulfonetetracarboxylic dianhydride, 4,4'-(ethyne-1,2-diyl)diphthalic anhydride, hydroquinone dianhydride, benzophenone-3,3',4,4'-tetracarboxylic dianhydride, 2,2',3,3'-biphenyltetracarboxylic dianhydride, and 2,3,3',4'-biphenyltetracarboxylic dianhydride.

Non-limiting examples of preferred aromatic diamines that may be used as a solubilizing component in the polymer design may be 2,2'-bis(trifluoromethyl)benzidine, 4,4'-oxydianiline, 3,4'-oxydianiline, 3,3'-oxydianiline, 1,5-diaminonaphthalene, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 4,4'-bis(4-amino-2-trifluoromethylphenoxy)biphenyl, 4,4'-bis(4-aminophenoxy)biphenyl, 1,4-bis(4-amino-2-trifluoromethylphenoxy)benzene, 5-(trifluoromethyl)-1,3-phenylenediamine, 2-(trifluoromethyl)-1,4-phenylenediamine, 3,3'-diaminobenzophenone, 4,4'-diaminobenzophenone, 3,4'-diaminobenzophenone, 2,5-bis(4-aminophenoxy) biphenyl, 3,3'-dihydroxybenzidine, bis(3-aminophenyl) sulfone, bis(3-amino-4-hydroxyphenyl) sulfone, and bis(3-amino-4-hydroxyphenyl) sulfone.

In even more preferred embodiment of the invention, the rigid linear components in the polymer design optionally would be selected from 3,3',4,4'-biphenyltetracarboxylic dianhydride, 1,2,4,5-benzenetetracarboxylic dianhydride, naphthalene-1,4,5,8-tetracarboxylic dianhydride, p-phenylenediamine, and m-phenylenediamine, and the solubilizing components in the polymer design would be selected from 4,4'-oxydiphthalic anhydride, 3,4'-oxydiphthalic anhydride, benzophenone-3,3',4,4'-tetracarboxylic dianhydride, 2,2',3,3'-biphenyltetracarboxylic dianhydride, 2,3,3',4'-biphenyltetracarboxylic dianhydride, 2,2'-bis(trifluoromethyl)benzidine, 1,5-diaminonaphthalene, 5-(trifluoromethyl)-1,3-phenylenediamine, 2-(trifluoromethyl)-1,4-phenylenediamine, and 3,3'-dihydroxybenzidine.

In the most preferable embodiment of the invention, the rigid linear monomers in the copolymer would optionally be selected from 3,3',4,4'-biphenyltetracarboxylic dianhydride, 1,2,4,5-benzenetetracarboxylic dianhydride, p-phenylenediamine, and m-phenylenediamine, and the solubilizing components in the polymer design would be 4,4'-oxydiphthalic anhydride and 2,2'-bis(trifluoromethyl)benzidine. These monomers were found to present the most advantageous thermal stability, solution viscosity, chemical resistance, and hydrolytic stability. In this most preferred embodiment of the invention, terminal mono-functional monomers would be selected from phthalic anhydride, tetrabromophthalic anhydride, aniline, and 4-(phenylethynyl)phthalic anhydride.

2. Method for Producing Polyamic Acid Polymers

The polyamic acid copolymers of the current disclosure are optionally obtained by solution polymerization at 0 to 50° C., typically in a polar aprotic solvent, most preferably n-methyl-2-pyrrolidone (NMP). Depending on the solubility of the polymer composition, other solvents such as dimethylacetamine, dimethylformamide, dimethsulfoxide, sulfolane, tetrahydrofuran, dioxolanes, dioxanes, methoxybenzene, methylbenzoate, tetramethylurea, dimethoxybenzene, and dibasic esters of adipic, glutaric, and succinic acids may be used. The diamine monomers are dissolved in a well-dried reaction vessel. In the case where a terminal mono-functional amine is used, this monomer is dissolved together with the diamine monomers. In the case were a terminal monofunctional anhydride is used, it may be either added to the reaction together with or prior to the dianhydride monomers.

To complete the polymerization, the dianhydride monomers are added into the reactor containing the diamines with good agitation; the dianhydride monomers may be added as a solid, slurry in a solvent, or solution in solvent. The reaction vessel is cooled during polymerization such that the internal temperature remains between 0 and 50° C. through the exothermic reaction. The solution is then stirred until polymerization is complete, evidenced by a constant solution viscosity, typically 1 to 24 hours.

3. Method for Producing Polyimide Polymers

The polyimide polymer of the current disclosure is optionally obtained by heating the polyamic acid polymer solution to temperatures between 120 and 230° C. which causes cyclodehydration to occur. The resulting water is either directly or azeotropically distilled from the reaction until at least the theoretical amount of water is collected, indicating complete imidization has been achieved. The temperature and time of thermal imidization is dependent on the choice of reaction solvent. For example, to produce a polyimide in NMP, thermal imidization is performed between 150° C. and 205° C. for 30 minutes to 12 hours.

Alternatively, imidization may be performed chemically by methods common to the art, adding chemical imidization catalysts and dehydrating agents. This approach allows for synthesis in lower boiling point solvents as well as the use of terminal crosslinking agents with cure temperatures less than the temperature required to thermally imidize the polymer. This is performed by adding an imidization catalyst, such as picoline or trimethylamine, and a dehydrating agent, such as acetic anhydride or benzoic anhydride, to the polyamic acid solution and stirring it for 1 to 48 hours. If desired, the chemically imidized polymer may be heated during or subsequent to chemical treatment to ensure that the polymer is brought to a high degree of imidization.

Alternatively, the polyamic acid polymer may also be dried to a solid film or powder and subsequently imidized at temperatures ranging from 100 to 500° C.

4. Properties of Polymers from the Polymer Design

Thermal Properties

The polyamic acid or polyimide polymers resulting from the design concept of the current disclosure possess an onset temperature of thermal decomposition greater than 500° C. measured at 2° C./min in air on neat polymer or well-cured coated articles, a time to 20% mass loss at 450° C. in air greater than 7 hours on well-cured coated articles, and a glass transition temperature greater than 250° C.

Solids Content and Viscosity

Coating solutions prepared from the polyamic acid or polyimide polymers resulting from the design concept of the current disclosure may have a viscosity in the range of 2,000 to 20,000 mPa-s at 30° C. and shear rate of 20 s−1 when dissolved in n-methyl-2-pyrrolidone (NMP) at a solids content of 12 to 30 wt %.

Chemical Resistance

The polyamic acid or polyimide polymers resulting from the design concept of the current disclosure do not dissolve in fluids common to the avionics and automotive industries such as fuels, hydraulic fluids, coolants, lubricating oils, water-based cleaning solutions, and alcohol cleaning solutions as given in the Examples.

Chemical Stripping

The design concept of the current disclosure provides a path to soluble polyimide polymers that may be stripped from coated articles with some polar aprotic solvents. The design concept of the current disclosure provides a path to soluble polyimide polymers that may be cross-linked on coated articles in order to render the polyimide coating insoluble in polar aprotic solvents.

Molecular Weight

The polyamic acid or polyimide polymers resulting from the design concept of the current disclosure have a number average molecular weight of 10,000 to 50,000 g/mol assessed by gel permeation chromatography in tetrahydrofuran calibrated against polystyrene standards.

Mechanical Properties

The polyamic acid or polyimide polymers resulting from the design concept of the current disclosure possess a tensile modulus of at least 2.0 GPa, ultimate strength of at least 140 MPa, and ultimate elongation of at least 20% at 25° C.

Electrical Properties

The polyamic acid or polyimide polymers resulting from the design concept of the current disclosure possess a dielectric constant of 2.5 to 4.0 at 25° C. and 1 kHz.

These examples further describe the present disclosure demonstrating the effectiveness of the polymer design model to optimize polyamic acid polymers and polyimide polymers for maximum thermal stability, solubility in a solvent, and coating quality. However, the current disclosure is not limited to the polymer compositions or application in the following examples and should not be considered so limited. The methods described below were utilized to evaluate the properties of polymer solutions and coated optical fiber performance.

Thermal Decomposition (Pyrolysis) Temperature ($T_{d,onset}$)

The thermal decomposition temperature of polyamic acid polymers, polyimide polymers, and these applied to optical fibers was measured by thermal gravimetric analysis (TGA) with a temperature ramp rate of 2° C./min in an air atmosphere to 700° C. For the evaluation of polymer materials, the polymer solution was loaded in a platinum TGA pan and immediately evaluated, and thermal decomposition temperature was reported as the onset temperature ($T_{d,onset}$), determined by the intersection of two tangents drawn around the thermal decomposition shoulder in the 450 to 600° C. range. For the evaluation fiber optic coatings, a sample of fiber was evaluated by TGA at 2° C./min from 25 to 700° C. in air. The resulting data was normalized to account for the mass of the glass fiber taken from 650° C., and thermal decomposition temperature was reported as the onset temperature ($T_{d,onset}$), determined by the intersection of two tangents drawn around the thermal decomposition shoulder in the 450 to 600° C. range.

Isothermal Lifetime Projections

Figure 4:
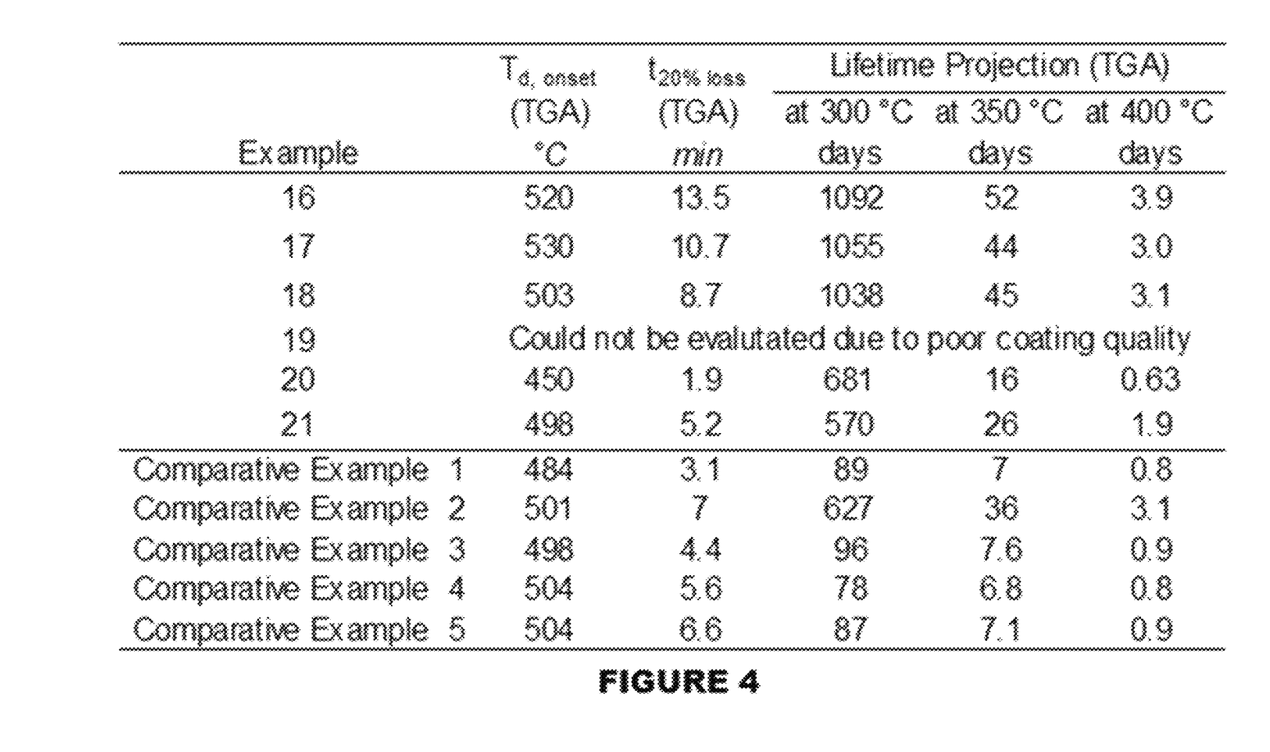
FIG. 4 shows thermal performance for onset of thermal decomposition of polymers of the present disclosure.

Isothermal lifetime projections were performed in accordance with the methods presented by Stolev et al., see FIG. 4. The analysis was performed by evaluating specimens by the thermal decomposition temperature methods given above at four different temperature ramp rates in air (2, 5, 7, 10° C./min) using TGA. Isothermal lifetime projections were calculated assuming a failure criterion of 20 wt % loss. The temperature at 20 wt % loss and rate of mass loss with respect to time around 20 wt % loss were determined for each temperature ramp rate. The logarithmic trend within this data set was used to obtain the pre-exponential constants and activation energies to be used in the Arrhenius equation, which then allows the projected lifetime to reach 20 wt % loss to be calculated at any temperature.

Accelerated Isothermal Decomposition Lifetime ($t_{20\% \, loss}$)

In order to compare the thermal stability of polymer at high temperatures, isothermal gravimetric analysis was performed using TGA. Specimens were raised to 450° C. at 10° C./min in a nitrogen atmosphere then held at 450° C. in air, and the isothermal decomposition lifetime was reported as the time required to reach 20 wt % loss in minutes. For the evaluation of polymer materials, the polymer solution was loaded in a platinum TGA pan and immediately evaluated. For the evaluation fiber optic coatings, a sample of fiber was evaluated by TGA, and the method included an additional ramp to 700° C. in air at the end of the run to obtain the total mass of coating on the fiber.

Viscosity of Solutions

The viscosity of solutions was evaluated with a spindle rheometer at a shear rate of 20 s$^{-1}$ and 30° C.

Rapid Cure Film Quality

The rapid curing performance of the polyamic acid polymers and the polyimide polymers was evaluated by coating a thin film (50-75 μm) on a clean glass microscope slide and placing it immediately on aluminum block heated to 350-400° C. The films dried to a tack-free film in 3-5 seconds, but were kept on the curing block for at least 30 seconds. The films were visually inspected for cracks and opacity, both of which can be attributed to crystallization or anisotropy of the polymer during rapid curing and imidization. The films were then removed from the substrate with a razor blade to qualitatively assess adhesion to glass, and the film was creased at 180° to evaluate its bend toughness.

Additionally, the polyimide compositions of the current disclosure may be formed into a variety of forms including films (including but not limited to polyimide films), powders, composites, sprays, emulsions, foams, melts, or combinations of the above. The versatility of the polyimide allows these various forms to be used to coat articles ranging from films to wires.

Example 1—Preferred Synthesis of Polyamic Acid Polymer

A reaction vessel equipped with a mechanical stirrer and inert gas inlet was charged with 3.785 g (0.0350 mol) of 1,4-diaminobenzene (hereinafter abbreviated as "PDA"), 4.803 g (0.0150 mol) of 2,2'-bis(trifluoromethyl)benzidine (hereinafter abbreviated as "TFM"), and 32 g of anhydrous n-methyl-2-pyrrolidone (hereinafter abbreviated as "NMP") and stirred for 30 minutes to dissolve the monomers. A slurry of dianhydride monomers containing 10.298 g (0.0350 mol) of 2,3,3',4'-biphenyltetracarboxylic dianhydride (hereinafter abbreviated as "BPDA"), 4.653 g (0.0150 mol) of oxydiphthalic dianhydride (hereinafter abbreviated as "ODPA"), and 74.0 g of anhydrous NMP was added to the reaction vessel through an addition funnel, and the mixture was polymerized for 4 hours at room temperature with stirring.

The light amber colored polyamic acid solution was evaluated for thermal performance, solution viscosity, and rapid curing film quality. The viscosity of the solution was found to be 6,250 cP at 30° C. The specimen had an onset temperature of thermal decomposition of 569° C. in air and a time to 20 wt % loss at 450° C. in air of 1500 minutes. Rapidly curing a thin film on a clean glass microscope slide at 350° C. resulted in a transparent light yellow film with good adhesion to the glass slide. The film did not crack upon curing or when creased at 180°.

The solution was pressure filtered at 20 psi through 1 μm glass fiber filter media prior to being applied to glass optical fiber.

Figure 1:
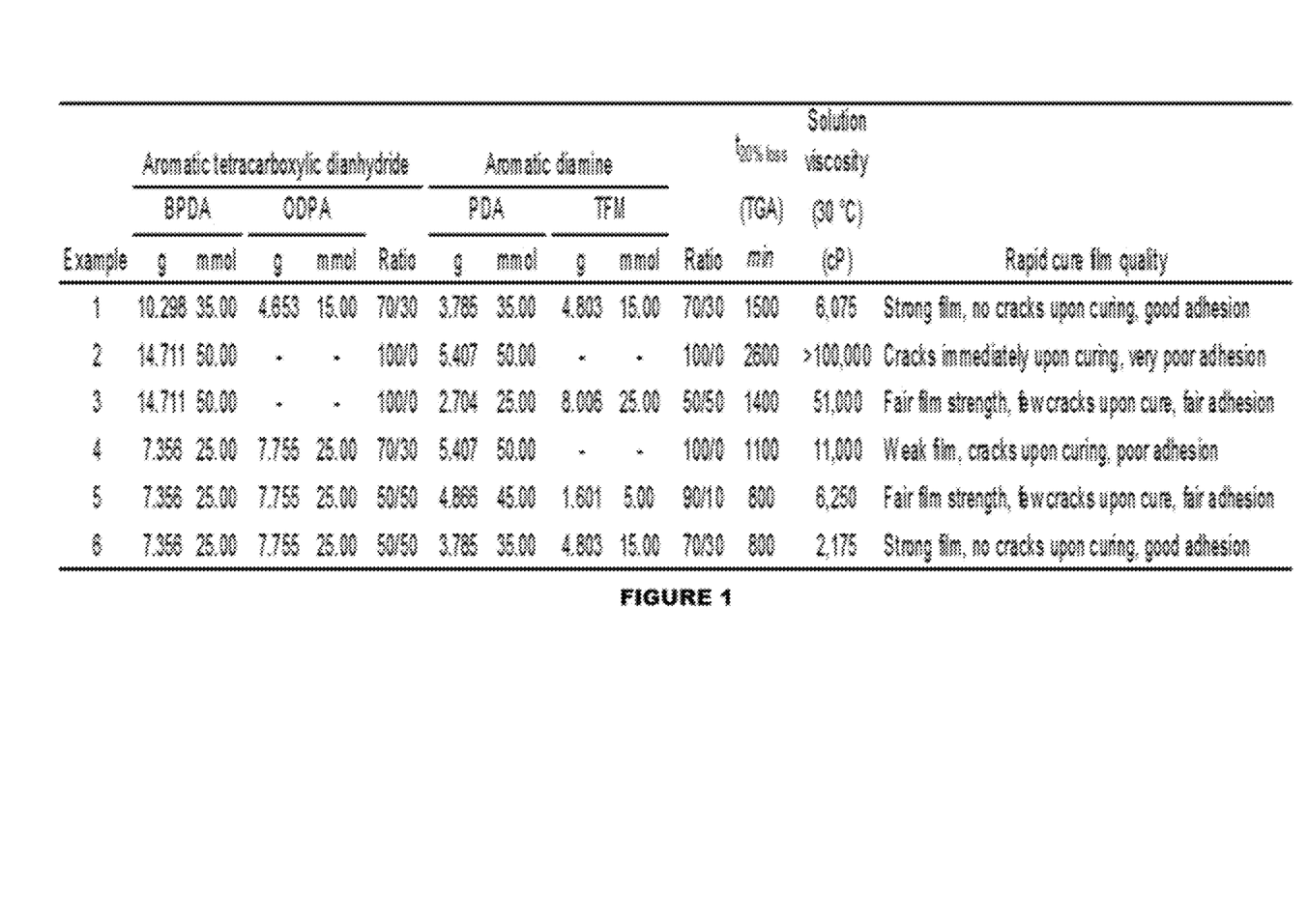
FIG. 1 shows isothermal lifetime projections of polymers of the present disclosure.

Examples 2 to 6—Optimization of Thermal Stability and Solubility of Polyamic Acid Polymer The synthetic methods given in Example 1 were used to prepare polyamic acid polymers with varying ratios of rigid monomers and solubilizing monomers, BPDA to ODPA and PDA to TFM for aromatic dianhydrides and diamines, respectively. The onset temperature of thermal decomposition in air of the specimen was measured by TGA at 2° C./min and found to be in the range of 555 to 575°. As shown in FIG. 1, the accelerated isothermal lifetime at 450° C. in air of the copolymers varied from 2500 minutes for Example 3 to 800 minutes for Examples 6 and 7, clearly demonstrating that the oxidative thermal stability of the polymer was reduced by increasing the content of ODPA and, to a lesser extent, TFM. The inverse trend was observed for solution viscosity, which ranged from 2,175 cP to greater than 100,000 cP, and showed that increasing ODPA and TFM content reduced solution viscosity. The rapid cure test showed poor film quality except for Examples 1 and 7, which produce strong and integral films with good adhesion to glass.

Examples 4 and 5 yielded polyamic acid polymers with fair thermal stability but poor film quality and viscosity that exceeds the target range of 2,000 to 20,000 cP for an 18 wt %. With moderate addition of both ODPA and TFM, Example 7 yielded the most attractive polyamic acid polymer with high thermal stability, viscosity in the target range, and excellent film quality when rapidly cured.

Example 7—Preferred One-Pot Synthesis of Polyimide Polymer

A reaction vessel equipped with a mechanical stirrer and inert gas inlet was charged with 0.557 g (0.0051 mol) of PDA, 14.843 g (0.0148 mol) of TFM, and 32 g of anhydrous NMP and stirred for 30 minutes to dissolve the monomers. A solution of terminal crosslinking agent with 0.745 g of 4-phenylethlynylphthalic anhydride (hereinafter abbreviated as "PEPA") and 7.0 g of anhydrous NMP was added to the reaction vessel and allowed to react with the diamine monomers. After 30 minutes, a slurry of dianhydride monomers containing 5.884 g (0.0200 mol) of BPDA, 9.306 g (0.0300 mol) of ODPA, and 67.0 g of anhydrous NMP was added to the reaction vessel through an addition funnel, and the mixture was polymerized for 1 hour at room temperature with stirring.

The polyamic acid solution was subsequently heated to 160 to 190° C., and a Dean-Stark apparatus was added to the reactor head. Toluene (30 mL) was added to the reaction mixture in order to facilitate cyclodehydration of the polyamic acid polymer to the polyimide through azeotropic removal of water. After refluxing toluene and removing water for 1 to 2 hours, the reaction was heated to 204° C., the boiling temperature of NMP, and toluene was distilled from the polymer solution. The reaction was held at 204° C. for 1 hour to ensure full imidization and removal of toluene and then cooled to room temperature.

The amber colored polyimide solution was evaluated for thermal performance and maximum fiber coating solids content. The final concentration of the reaction mixture was determined by TGA to be 19.4 wt %, and the concentration at 20,000 cP was calculated to be 26.1 wt %.

The specimen had an onset temperature of thermal decomposition of 569° C. in air and a time to 20 wt % loss at 450° C. in air of 1500 minutes.

Examples 8 to 15—Optimization of Thermal Stability and Solubility of Polyimide Polymer The synthetic methods given in Example 7 were used to prepare polyimide copolymers with varying ratios of rigid monomers and solubilizing monomers, BPDA to ODPA and PDA to TFM for aromatic dianhydrides and diamines, respectively, and with terminal crosslinking agent. The base soluble polyimide composition for this series was ODPA-TFM. In order to increase thermal stability, BPDA and PDA were added to the copolymer composition, and the PEPA terminal crosslinking agent was added in order to reduce solution viscosity.

Figure 2:
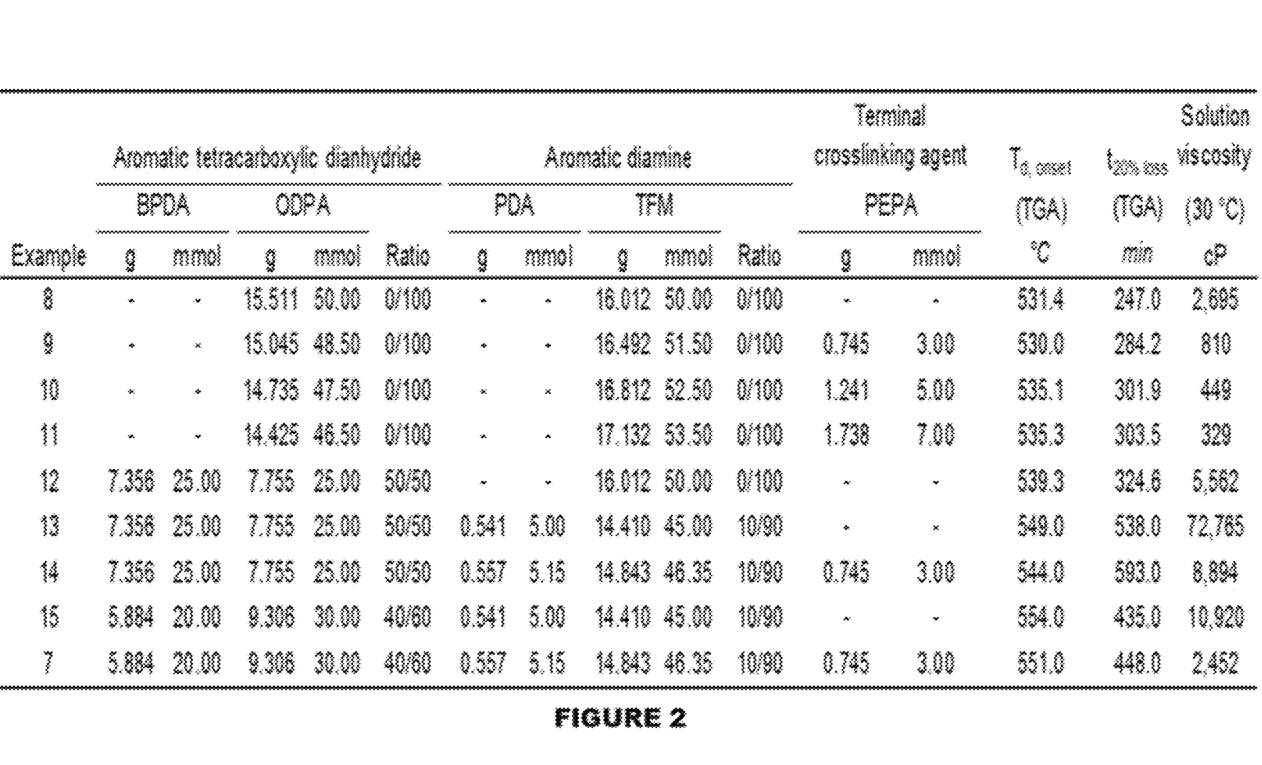
FIG. 2 illustrates thermal decomposition onset temperatures for polymers of the current disclosure.

As shown in FIG. 2, the thermal decomposition onset temperatures of the specimens were measured by TGA at 2° C./min in an air atmosphere and found to range from 530 to 554° C., generally increasing with BPDA and PDA content in the copolymer and decreasing slightly with the addition of PEPA terminal groups. Similarly, the accelerated isothermal lifetime at 450° C. in air of the copolymers increased with BPDA and PDA content but also increased with the addition of more PEPA to the copolymer structure. It was observed that solution viscosity at 18 wt % in NMP ranged from 72,765 cP to only 329 cP, showing very strong increase in viscosity with the addition of PDA content and reduction of viscosity with the addition of PEPA to the copolymer composition.

These examples demonstrate that all components of the polymer design model (a rigid aromatic dianhydride monomer, a solubilizing aromatic dianhydride monomer, a rigid aromatic diamine monomer, a solubilizing aromatic diamine monomer, and terminal crosslinking groups) were necessary produce a soluble, pre-imidized polyimide composition with excellent thermal stability and solution viscosity within the target range of 2,000 to 20,000 cP.

Example 16

A solution was prepared for optical fiber coating with the polyamic acid polymer composition and methods given in Example 1. The solution, with concentration of 18 wt % in NMP and viscosity of 6,000 cP at 30° C., was filtered through 1 μm glass fiber filter media prior to application to optical fiber.

Example 17

A solution was prepared for optical fiber coating with the polyimide polymer composition and methods given in Example 7. The solution was then concentrated by distillation of NMP at 100° C. to a concentration of 22 wt %. The concentrated solution had a viscosity of 13,000 cP at 30° C. The solution was filtered through 1 μm glass fiber filter media prior to application to optical fiber.

Example 18

A solution of the soluble, pre-imidized polyimide composition given in Example 7 was prepared in methoxybenzene for low temperature fiber coating. The polyimide was synthesized by the methods given in Example 7, and then precipitated into methanol, washed with pure methanol to extract NMP residues, vacuum dried, and then dissolved in methoxybenzene to 21 wt %. The solution had a viscosity of 11,000 cP at 30° C., and was filtered through 1 μm glass fiber filter media prior to application to optical fiber.

Example 19

A solution was prepared for optical fiber coating with the polyamic acid polymer composition given in Example 2 and synthetic methods given in Example 1. The solution, with concentration of 10 wt % in NMP and viscosity of 9,950 cP at 30° C., was filtered through 1 μm glass fiber filter media prior to application to optical fiber.

Example 20

A comparative example of a soluble, pre-imidized polyimide composition was prepared according to methods given in Example 7 with 23.529 g (0.053 mol) of 4,4'-(hexafluoroisopropylidene)diphthalic anhydride (hereinafter abbreviated as 6FDA) and 3.879 g 1,5-diaminonaphthalene (hereinafter abbreviated as NDA). This polyimide was tested as a material representative of conventional soluble pre-imidized polyimides, which often utilize the 6FDA monomer to solubilize the polyimide. The solution of 6FDA-NDA polyimide was prepared at 14 wt % in dimethylsulfoxide (hereinafter abbreviated as DMSO) with a viscosity of 12,000 cP at 30° C. The solution was filtered through 1 μm glass fiber filter media prior to application to optical fiber.

Example 21

HD Microsystems polyamic acid polymer coating PI-2525 was also drawn on fiber as a comparative example. This polyamic acid was supplied as a 25 wt % in NMP with viscosity of 6,000 cP.

Optical fibers were drawn from F300 grade silica rod and coated with Examples 16 through 21. Fiber was drawn at a rate of 20 m/min through a 3-foot nitrogen-purged oven with cure temperatures of 200 to 500° C. The coatings were applied to the fiber prior to the curing oven with a solid coating head at a pressure of 1 bar and a dye size of 250 μm, except for Example 20 which used a 375 μm dye. Coating thickness was monitored in real time by a laser diameter gauge positioned after the thermal curing oven. Coating quality was qualitatively assessed based on inspection with an optical microscope for defects, cracking, delamination, voids, blisters, and beading of the coating. The fibers were manually abraded with a low lint cloth to observe the toughness and adhesion of the coating to the glass fiber substrate. The solubility of the polyimide coatings on fiber optic samples was evaluated by immersing sections of fiber in NMP at room temperature for 5-10 minutes. The fibers were inspected with an optical microscope for changes in the coating. Insoluble coatings showed no change. Swellable coatings showed dimensional change and some cracking of the coating due to uptake of the solvent; these could be wiped/stripped from the fiber with a low lint cloth. Soluble coatings were dissolved from the fiber during the NMP immersion.

Figure 3:
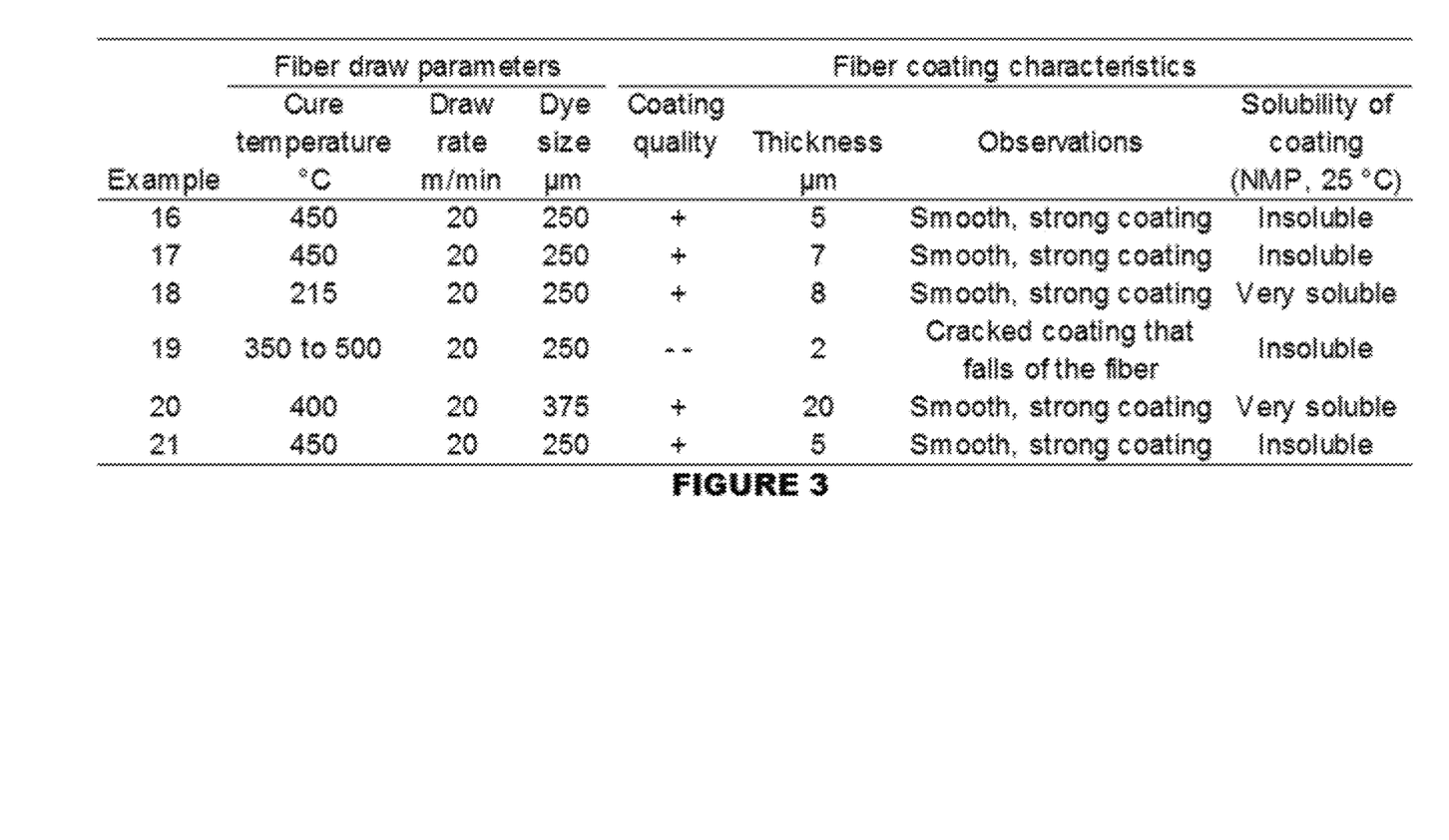
FIG. 3 illustrates fiber coating characteristics for polymers of the current disclosure.

As shown in FIG. 3, Example 19 (BPDA-PDA polyamic acid) yielded a very thin, cracked coating that was very fragile such that it could be readily removed from the fiber with little to no perturbation. This was observed across the whole range of curing temperatures from 350 to 500° C. The other coating yielded a smooth, strong coating with few or no defects.

The application of a polyimide coating at low temperature (215° C.) as well as a solvent strippable polyimide coating were demonstrated with Example 18, which showed good coating quality and high solubility in NMP. In conjunction, Example 17 demonstrated the efficacy of the PEPA terminal crosslinking agent to render the fiber coating insoluble when it is applied at high temperature (450° C.).

Example 20 demonstrated the ability to apply soluble pre-imidized polyimide in very thick layers on optical fiber and yet obtain a coating with good quality and thermal performance.

As shown in FIG. 4, the thermal performance of Examples 16 through 21 were evaluated for onset of thermal decomposition, accelerated isothermal lifetime at 450° C. in air, and isothermal lifetime projections in air by previously described methods. Comparative Examples 1 through 5, which are current commercial polyimide fibers, were evaluated by the same methods.

The highest thermal performance was observed in Examples 16 and 17, which showed large increases for all tests compared to the comparative examples. The soluble pre-imidized polyimide deposited at low temperature, Example 18, showed slightly lower onset temperatures and isothermal lifetime compared to Example 17, which is the same polyimide applied from NMP at high temperature. However, the thermal lifetime projections suggested that this coating possessed equivalent isothermal lifetime to Examples 16 and 17 at use temperatures in the 300 to 400° C. range.

Example 20, a conventional soluble polyimide composition, exhibited very poor thermal performance in all three evaluations, due to the low stability of the polymer structure. The thermal performance of Example 20 is representative for typical soluble polyimides, which demonstrates that the polymer design model of the current disclosure results in soluble polyimide compositions with a distinct performance advantage over conventional materials.

Figure 5:
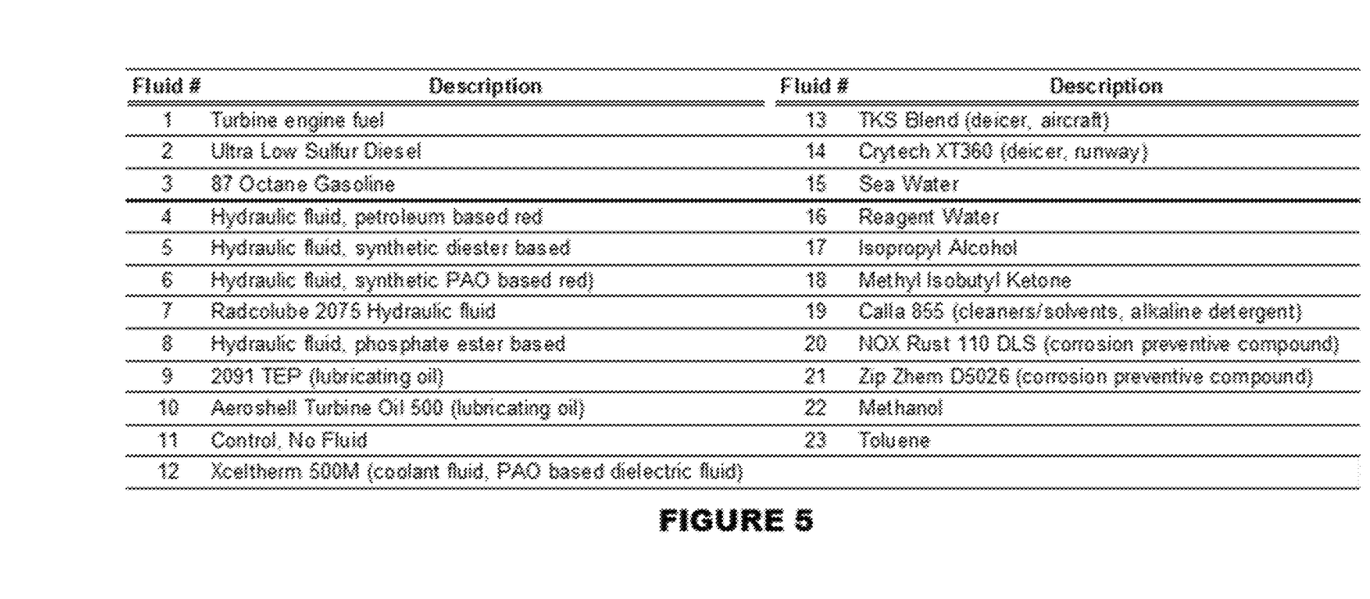
FIG. 5 shows chemical resistance results of coated optical fiber and polymer films of the current disclosure immersed in the fluids listed.

Coated optical fiber and polymer films prepared from Examples 16 through 18 were immersed in the fluids listed in FIG. 5 for 48 hours at room temperature in order to evaluate their chemical resistance. These fluids are common to harsh environment optical fiber applications. Fiber samples were observed for visible defects using an optical microscope, and polymer films were evaluated for fluid uptake or weight loss by weighing the mass of the films before and after immersion. No degradation to the integrity of the fiber coatings and no weight change within ±3% was observed for Examples 16 through 18. This clearly demonstrates that polymer design model of the current disclosure results in polyimide materials that provide high solubility in the coating solution as well as good chemical resistance after deposition and curing.

Coated fibers prepared from Examples 16 through 18 were immersed in various polar organic solvents in order to evaluate the ability to strip the polyimide coatings from the fiber with solvents other than hot sulfuric acid, which is common practice in the industry. It was found that Examples 16 and 17 could not be stripped from the fiber with any polar solvents. In fact, these coatings remained intact after soaking in their coating solvent, NMP, at 45° C. for 10 days. This further demonstrates the chemical resistance of the polyimide materials. Most notably, these results emphasize the efficacy of polymer design of the current disclosure to employ crosslinkable end groups to impart very high chemical resistance to a soluble polyimide after high temperature curing.

In contrast to Examples 16 and 17, the fiber prepared from Example 18, which was cured at low temperature and exhibited good chemical resistance to common industry fluids, could be stripped from the fiber with a number of polar organic solvents. It was found that the coating could be cleanly stripped from the fiber after soaking at room temperature for 10 minutes in methylethylketone (MEK), tetrahydrofuran (THF), and n-methyl-2-pyrrolidone (NMP). Additionally, this coating could be cleanly stripped from the fiber after only 2 minutes in NMP at 45° C.

In a further embodiment, the present disclosure provides an application for pre-imidized polyimide coating solutions used for recoating optical fiber or other substrates. For example, when optical fibers are cut and spliced together, they are typically recoated with UV or chemically curable polymer resins such as epoxies. For polyimide coated fibers, these recoated sections possess much lower thermal stability and chemical resistance than the virgin polyimide coating; thus they are more prone to failure in use. With a pre-imidized coating solution, recoating may be performed at lower temperatures in a low boiling point solvent and result in a recoated section with performance equal to the original polyimide fiber. Furthermore, if a crosslinkable soluble polyimide, such as those provided by the polymer design of the present disclosure, is used as both the original fiber coating and recoating polymer, the original polyimide coating would be swelled or partially dissolved by the recoating solution. When dried and thermally cured, the recoating polyimide would covalently bond with the original coating to provide fully integral coating with thermal stability and mechanical performance equivalent to the original fiber.

In a further embodiment, the present disclosure provides an application for pre-imidized polyimide coating solutions used for recoating optical fiber or other substrates. For example, when optical fibers are cut and spliced together, they are typically recoated with UV or chemically curable polymer resins such as epoxies. For polyimide coated fibers, these recoated sections possess much lower thermal stability and chemical resistance than the virgin polyimide coating; thus they are more prone to failure in use. With a pre-imidized coating solution, recoating may be performed at lower temperatures in a low boiling point solvent and result in a recoated section with performance equal to the original polyimide fiber. Furthermore, if a crosslinkable soluble polyimide, such as those provided by the polymer design of the present disclosure, is used as both the original fiber coating and recoating polymer, the original polyimide coating would be swelled or partially dissolved by the recoating solution. When dried and thermally cured, the recoating polyimide would covalently bond with the original coating to provide fully integral coating with thermal stability and mechanical performance equivalent to the original fiber.

Since chemical resistance is desired in polyimide products for harsh environment applications, providing a means to crosslink the soluble polyimide is an important aspect of the polymer design in the present disclosure. The use of terminal crosslinking structures such as maleimide, propagyl, and phenylethynl moieties is well known in the preparation of polyimide oligomers with utility in resin transfer molding and fiber reinforced polymer composites (see, e.g. U.S. Pat. Nos. 5,493,002; 5,478,913; 7,015,304; 5,817,744; 7,019,103, which are incorporated herein in their entirety to the extent they do not contradict the current disclosure). By applying these technologies to the design of a soluble polyimide polymers, a pre-imidized solution can be provided that, after deposition and curing, results in a product with tunable chemical resistance based on thermal history. Using the example of polyimide coated optical fiber, this means that same coating could be used to provide a fiber product that can either be easily stripped from the fiber with common solvents or completely insoluble and chemically resistant. The fiber manufacturer can tune this property to customer specifications by adjusting the thermal cure schedule during the fiber draw or with post-treatments.

While terminal crosslinking provides a means to tune the chemical resistance of soluble polyimides, thermal stability is dependent on the composition of the polymer's backbone. A stark trade-off between thermal stability with respect to solubility of the polymer backbone is often observed. The benefits of pre-imidized, soluble polyimide have not been realized for many common polyimide applications because the performance of available soluble polyimide compositions are not appropriate for harsh environments.

In fields such as polymeric separation and transport membranes, polyimide compositions that remain soluble in organic solvents after being converted from polyamic acid to polyimide are typically used. Utilizing a solution of a fully-imidized polyimide (pre-imidized) eliminates the need for a very high temperature cure in manufacturing processes and, thus, provides more degrees of freedom in process design. Additionally, pre-imidized solutions have far superior shelf life compared to polyamic acid solutions, which can only be stored for several months even with refrigeration.

Similar process design freedom could be facilitated by the use of pre-imidized solutions in more common polyimide applications such as coated optical fiber, enameled metal wire, and integrated circuit fabrication where polyamic acid precursors are typically employed. U.S. Pat. No. 5,504,830 teaches the benefits of using a pre-imidized polyimide coating for optical fiber in contrast with the difficulties of curing a polyamic acid solution. The authors highlight that the use of pre-imidized solutions for fiber coating allows for reduced residence times in ovens at high temperature, provides a thicker polymer buffer layer, minimizes the number of coating applications, reduces bubbles or blisters during drying, and enables rapid, low temperature drying through the use of alternative solvents with lower boiling points.

In addition to these process benefits, the use of pre-imidized polyimide coatings could enable specialty fiber manufacturers to design fiber configurations that would not otherwise be possible. For example, reduction of residence time in high temperature ovens allows for polyimide coatings to be applied to fibers with thermally sensitive features such as low glass transition temperature glasses, fiber Bragg gratings, or other low temperature polymer primary coatings.

Typically, polyimide buffer layers must be removed from optical fiber by pyrolysis or hot sulfuric acid (at least 150° C.). Pyrolysis can leave ash on the fiber and can damage the glass. Hot sulfuric acid is dangerous and unusable outside of a well-controlled environment with appropriate safety equipment. Mechanical stripping of polyimides damages the glass due to the high mechanical moduli of the polymer and very strong adhesion. By coating a fiber with a soluble polyimide, the buffer layer can be stripped from the fiber with commons solvents, making polyimide fiber much easier for the end-user to connectorize, splice, window-strip, and repair.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A polyimide composition comprising:
    a dianhydride component further comprising;
        at least one rigid aromatic dianhydride monomer comprising 20 to 97 molar percent of the dianhydride component;
        at least one solubilizing aromatic dianhydride monomer comprising 3 to 80 molar percent of the dianhydride component;
        wherein the at least one rigid aromatic dianhydride and the at least one solubilizing aromatic dianhydride comprise 100 percent of the dianhydride component;
    a diamine component further comprising;
        at least one rigid aromatic diamine monomer comprising 10 to 75 molar percent of the diamine component;
        at least one solubilizing aromatic diamine monomer comprising 25 to 90 molar percent of the diamine component;
        wherein the at least one rigid aromatic diamine monomer and the at least one solubilizing aromatic diamine monomer comprise 100 percent of the diamine component;
    at least one terminal mono-functional end group comprising 0 to 7 molar percent of the total polymer composition;
    wherein the rigid aromatic monomers are selected to have solely unsubstituted aromatic hydrocarbons, no aliphatic carbon, no oxygen bridging unless bound within a five or six membered ring structure, and monomeric functionality in or near to a same plane;
    wherein the solubilizing monomers are selected to be aromatic monomers with non-coplanar aromatic rings, non-linear monomeric functionality, aliphatic or ether bridging between aromatic rings, one or more alkyl groups on the aromatic rings, or nitrogen or oxygen containing aromatic heterocycles; and
    wherein the cured polyimide composition, excluding any residual solvent mass, exhibits exceptional thermal stability evidenced by a time to 20% mass loss at 450° C. in air greater than 7 hours.

2. The polyamic acid precursor to the polyimide composition of claim 1.

3. The polyimide composition of claim 1 wherein the imidized polyimide composition is soluble in organic solvents.

4. The polyimide composition of claim 3 comprising a pre-imidized solution.

5. The polyimide composition of claim 3 comprising a solvent-strippable imidized coating on an article.

6. The polyimide composition of claim 5 wherein the solvent-strippable imidized coating is formed via deposition of a pre-imidized solution at temperatures from 25° C. to 400° C.

7. The polyimide composition of claim 5 deposited as a coating at a processing rate selected from the group consisting of: exceeding 1 meter per minute for free-standing films, exceeding 10 meters per minute for metal wire, or exceeding 20 meters per minute for optical fiber.

8. The polyimide composition of claim 1 comprising terminal crosslinkable end groups wherein the terminal crosslinkable end groups have single amine or anhydride functionality and additional functionality that allows for thermal, chemical, or photo-initiated crosslinking of the polyimide composition.

9. The polyimide composition of claim 6 comprising a polymer coating thermally cross-linked at temperatures between 300° C. and 500° C. to render the coating insoluble in conventional polyimide solvents.

10. The polyimide composition of claim 1 dissolved within at least one organic solvent.

11. The polyimide composition of claim 1, wherein the polyimide composition has a structure selected from the group consisting of films, powders, composites, sprays, emulsions, foams, melt processed articles, or combinations of the above.

12. The polyimide composition of claim 1 directly applied to an article.

13. The polyimide composition of claim 1 laminated as a free-standing film to an article either with or without an adhesive between the free-standing film and the article.

14. The polyimide composition of claim 1 wherein;
    3,3',4,4'-biphenyltetracarboxylic dianhydride (BPDA), p-phenylenediamine (p-PDA), or m-PDA are used as the rigid monomer components;
    4,4'-oxydiphthalic anhydride (ODPA) or 2,2'-bis(trifluoromethyl)benzidine (TFM) are used as the solubilizing monomer components; and
    phthalic anhydride or 4-(phenylethynyl)phthalic anhydride (PEPA) are terminal mono-functional end groups.

15. A method for forming the polyamic acid polymer of claim 1 comprising:
    charging a reaction vessel with diamines and NMP;
    introducing a solution of terminal mono-functional end group and NMP;

adding dianhydride monomers comprising dianhydrides and NMP; and
polymerizing the mixture.

16. The method of claim 15, wherein the polyamic acid is imidized via cyclodehydration through chemical or thermal treatment of the polyamic acid precursor as a solution or solid.

17. A polyimide composition comprising:
a dianhydride component further comprising;
   at least one rigid aromatic dianhydride monomer comprising 40 to 70 molar percent of the dianhydride component;
   at least one solubilizing aromatic dianhydride monomer comprising 30 to 60 molar percent of the dianhydride component;
   wherein the at least one rigid aromatic dianhydride and the at least one solubilizing aromatic dianhydride comprise 100 percent of the dianhydride component;
a diamine component further comprising;
   at least one rigid aromatic diamine monomer comprising 10 to 70 molar percent of the diamine component;
   at least one solubilizing aromatic diamine monomer comprising 30 to 90 molar percent of the diamine component;
   wherein the at least one rigid aromatic diamine monomer and the at least one solubilizing aromatic diamine monomer comprise 100 percent of the diamine component; and
at least one terminal mono-functional end group comprising 3 to 5 molar percent of the total polymer composition.

18. A method for forming polymer coatings with improved thermal stability and chemical resistance comprising:
forming a polyimide composition, wherein the polyimide composition comprises:
   a dianhydride component further comprising;
      at least one rigid aromatic dianhydride monomer comprising 20 to 97 molar percent of the dianhydride component;
      at least one solubilizing aromatic dianhydride monomer comprising 3 to 80 molar percent of the dianhydride component;
      wherein the at least one rigid aromatic dianhydride and the at least one solubilizing aromatic dianhydride comprise 100 percent of the dianhydride component;
   a diamine component further comprising;
      at least one rigid aromatic diamine monomer comprising 10 to 75 molar percent of the diamine component;
      at least one solubilizing aromatic diamine monomer comprising 25 to 90 molar percent of the diamine component;
      wherein the at least one rigid aromatic diamine monomer and the at least one solubilizing aromatic diamine monomer comprise 100 percent of the diamine component;
   at least one terminal mono-functional end group comprising 0 to 7 molar percent of the total polymer composition;
   applying the polyimide composition to an article, wherein the polyimide composition is applied in a form selected from the group comprising a film, powder, composite, spray, emulsion, foam, melt, or combinations of the above; and
wherein the cured polyimide composition, excluding any residual solvent mass, exhibits exceptional thermal stability evidenced by a time to 20% mass loss at 450° C. in air greater than 7 hours.

19. A polyimide composition comprising:
a dianhydride component further comprising;
   at least one rigid aromatic dianhydride monomer comprising 20 to 97 molar percent of the dianhydride component;
   at least one solubilizing aromatic dianhydride monomer comprising 3 to 80 molar percent of the dianhydride component;
   wherein the at least one rigid aromatic dianhydride and the at least one solubilizing aromatic dianhydride comprise 100 percent of the dianhydride component;
a diamine component further comprising;
   at least one rigid aromatic diamine monomer comprising 10 to 75 molar percent of the diamine component;
   at least one solubilizing aromatic diamine monomer comprising 25 to 90 molar percent of the diamine component;
   wherein the at least one rigid aromatic diamine monomer and the at least one solubilizing aromatic diamine monomer comprise 100 percent of the diamine component;
at least one terminal mono-functional end group comprising 0 to 7 molar percent of the total polymer composition;
further comprising forming the polyimide composition by:
   charging a reaction vessel with diamines and NMP;
   introducing a solution of terminal mono-functional end group and NMP;
   adding dianhydride monomers comprising dianhydrides and NMP; and
   polymerizing the mixture.

20. A polyimide composition comprising:
a dianhydride component further comprising;
   at least one rigid aromatic dianhydride monomer comprising 20 to 97 molar percent of the dianhydride component;
   at least one solubilizing aromatic dianhydride monomer comprising 3 to 80 molar percent of the dianhydride component;
   wherein the at least one rigid aromatic dianhydride and the at least one solubilizing aromatic dianhydride comprise 100 percent of the dianhydride component;
a diamine component further comprising;
   at least one rigid aromatic diamine monomer comprising 10 to 75 molar percent of the diamine component;
   at least one solubilizing aromatic diamine monomer comprising 25 to 90 molar percent of the diamine component;
   wherein the at least one rigid aromatic diamine monomer and the at least one solubilizing aromatic diamine monomer comprise 100 percent of the diamine component;
at least one terminal mono-functional end group comprising 0 to 7 molar percent of the total polymer composition; and
further comprising forming the polyimide composition by:
   charging a reaction vessel with diamines and NMP;

introducing a solution of terminal mono-functional end group and NMP; adding dianhydride monomers comprising dianhydrides and NMP;
polymerizing the mixture; and
wherein the polyamic acid is imidized via cyclodehydration through chemical or thermal treatment of the polyamic acid precursor as a solution or solid.

* * * * *